United States Patent
O'Donnell et al.

(10) Patent No.: US 12,062,046 B2
(45) Date of Patent: Aug. 13, 2024

(54) METHODS AND SYSTEMS FOR AUTHENTICATING USERS FOR AUTHORIZATION RULE RELAXATION

(71) Applicant: MasterCard International Incorporated, Purchase, NY (US)

(72) Inventors: Gina O'Donnell, St. Charles, MO (US); Adam Kelly, O'Fallon, MO (US); Sean Patrick Dailey, O'Fallon, MO (US); Jared Ryan Boucher, Troy, MO (US); Julian Davis, Cheltenham (GB); Rui Li, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 890 days.

(21) Appl. No.: 15/345,745

(22) Filed: Nov. 8, 2016

(65) Prior Publication Data
US 2018/0130062 A1    May 10, 2018

(51) Int. Cl.
*G06Q 20/40* (2012.01)
*G06Q 20/10* (2012.01)
*G06Q 20/20* (2012.01)

(52) U.S. Cl.
CPC ..... *G06Q 20/40145* (2013.01); *G06Q 20/102* (2013.01); *G06Q 20/20* (2013.01);
(Continued)

(58) Field of Classification Search
None
See application file for complete search history.

(56) References Cited

U.S. PATENT DOCUMENTS

| | | | | |
|---|---|---|---|---|
| 4,720,860 A | * | 1/1988 | Weiss | G06F 7/582 380/28 |
| 8,116,731 B2 | * | 2/2012 | Buhrmann | G06Q 20/4014 455/410 |

(Continued)

OTHER PUBLICATIONS https://web.archive.org/web/20160223013321/http://scottschober.com/glossary-of-cybersecurity-terms/ (published and archived on Feb. 23, 2016, most recently visited Sep. 8, 2018).*

(Continued)

*Primary Examiner* — Nathan C Uber
*Assistant Examiner* — Kimberly S. Bursum
(74) *Attorney, Agent, or Firm* — Armstrong Teasdale LLP

(57) ABSTRACT

A method of authenticating an accountholder for relaxing payment transaction authorization rules is provided. The method is implemented using an authentication computing device in communication with a memory device. The method includes receiving a transaction decline message from an issuer via a transaction message channel, transmitting an authorization rules relaxation message to an accountholder computing device via an authentication message channel separate from the transaction message channel, receiving an authorization rules relaxation response message via the authentication message channel, authenticating the authorization rules relaxation response message as originating from the accountholder, receiving an authorization request message associated with a reattempted payment transaction, inserting a rules relaxation identifier into the authorization request message, providing the authorization request message to the issuer computing device, causing modification of transaction decline systems, and receiving an approval message denoting authorization rules relaxation and acceptance of the second payment transaction by the issuer.

20 Claims, 10 Drawing Sheets

(52) U.S. Cl.
CPC ....... *G06Q 20/4014* (2013.01); *G06Q 20/405* (2013.01); *G06Q 20/407* (2013.01)

(56) References Cited

U.S. PATENT DOCUMENTS

| | | | | |
|---|---|---|---|---|
| 8,245,044 | B2* | 8/2012 | Kang | G06Q 20/42 713/176 |
| 8,401,904 | B1* | 3/2013 | Simakov | G06Q 20/3572 705/16 |
| 8,588,748 | B2* | 11/2013 | Buhrman | G06Q 20/4014 455/410 |
| 8,655,782 | B2* | 2/2014 | Poon | G06Q 20/20 705/44 |
| 8,793,490 | B1* | 7/2014 | Szwalbenest | H04L 69/14 713/168 |
| 2002/0143634 | A1* | 10/2002 | Kumar | G06Q 20/20 705/18 |
| 2005/0268107 | A1* | 12/2005 | Harris | G06F 21/31 713/182 |
| 2010/0125737 | A1* | 5/2010 | Kang | G06Q 20/12 713/176 |
| 2011/0178926 | A1* | 7/2011 | Lindelsee | G06Q 20/40 705/44 |
| 2011/0238510 | A1* | 9/2011 | Rowen | G06K 9/3283 705/16 |
| 2011/0251910 | A1* | 10/2011 | Dimmick | G06Q 20/322 705/17 |
| 2011/0282789 | A1* | 11/2011 | Carroll | G06Q 20/18 705/44 |
| 2012/0131121 | A1* | 5/2012 | Snyder | G06Q 20/401 709/206 |
| 2012/0271768 | A1* | 10/2012 | Kang | G06Q 20/425 705/44 |
| 2014/0019352 | A1* | 1/2014 | Shrivastava | G06Q 20/3674 705/41 |
| 2014/0040155 | A1* | 2/2014 | Buhrmann | G06Q 20/4014 705/325 |
| 2015/0046340 | A1* | 2/2015 | Dimmick | H04L 63/104 705/72 |
| 2015/0269577 | A1* | 9/2015 | Avegliano | G06Q 20/4016 705/44 |
| 2015/0319161 | A1* | 11/2015 | Dimmick | H04W 4/025 726/4 |
| 2015/0324795 | A1* | 11/2015 | Gerber | G06Q 20/34 705/44 |
| 2016/0027010 | A1* | 1/2016 | Babatz | G06Q 20/4012 705/73 |
| 2016/0180343 | A1* | 6/2016 | Poon | G06Q 20/20 705/75 |
| 2016/0189154 | A1* | 6/2016 | Eramian | G06Q 20/405 705/44 |
| 2016/0260100 | A1* | 9/2016 | Wiesman | G06Q 20/4016 |
| 2016/0321643 | A1* | 11/2016 | Beck | G06Q 20/3224 |
| 2018/0114224 | A1* | 4/2018 | Newland | H04L 63/123 |

OTHER PUBLICATIONS https://web.archive.org/web/20160602121234/https://en.wikipedia.org/wiki/Two-factor_authentication (published and archived on Feb. 6, 2016, most recently visited Sep. 8, 2018).*
https://www.magnifymoney.com/blog/banking-apps/2015s-best-worst-mobile-banking-apps/, blog postdated Dec. 15, 2015 (Year: 2015).*
https://www.magnifymoney.com/blog/banking-apps/2015s-best-worst-mobile-banking-apps/ blog postdated Dec. 15, 2015 (Year: 2015) (Year: 2015).*
PCT International Search Report and Written Opinion, Application No. PCT/US2017/055709, dated Feb. 8, 2018, 14 pps.

* cited by examiner

METHODS AND SYSTEMS FOR AUTHENTICATING USERS FOR AUTHORIZATION RULE RELAXATION

BACKGROUND

This disclosure relates generally to the field of electronic account authentication systems. More specifically, the disclosure relates to authenticating a financial accountholder using additional information after an initial payment transaction is declined.

As a matter of background, accountholders may use a variety of methods to perform payment transactions to purchase goods and services. These methods include use of plastic payment cards and personal computing devices (also known as accountholder computing devices) at point of sale (POS) devices operated by merchants. A payment processor computing device processes the payment transactions over a processing network. Where accountholder computing devices are used, data may be transmitted between an accountholder computing device and the payment processor computing device during a transaction. Data transmissions may include transaction data, which refers to data collected by the payment processor computing device. Transaction data may include authentication data, such as a username, account number, or the like. Transaction data may also include transaction date/time, transaction amount, merchant identifiers, or the like.

When a transaction is declined, known authentication systems suffer from limitations in that an accountholder may be unable to quickly ask for a transaction to be attempted a second time. In certain circumstances, multiple transactions within a short time may raise the suspicion of fraud. For example, identity theft of the accountholder may lead to a malicious user using the account in one location while the legitimate accountholder uses the account in another location. A malicious user may use the account to compile several purchases quickly before the issuer deactivates the account. Where the legitimate accountholder wishes to make multiple purchases, known systems often involve the accountholder having to contact the issuing bank (or issuer) where the accountholder's account is located. Known systems sometimes require that the accountholder provide personally identifiable information that may not be readily available. For example, an accountholder may be standing in line at a store waiting to make a purchase at a point of sale (POS) device in the store. In the event of a decline, the accountholder may be required to contact the issuer via a telephone and provide information such as a bank account number, routing number, or other forms of information that may not be in immediate possession of the accountholder.

A major inconvenience to the accountholder is having to make the telephone call, sit on hold or have the issuer apologize, but not get an immediate resolution to the issue. Moreover, whenever a transaction is declined, embarrassment for the accountholder often results. This is especially the case when issuer authorization rules trigger from a false positive. In other words, the legitimate accountholder attempted the transaction, but some anomalous characteristic of the transaction cause it to be declined. In such an event, even contacting the issuer is unlikely to resolve the issue. As a result, the merchant, issuer and payment network lose the transaction and the accountholder suffers a negative customer experience. Such instances accumulate to negatively impact the brand the issuer and the payment network. Known methods may also fail to prevent fraud, as a malicious user may call the issuer while impersonating the accountholder and attempt to get the issuer to permit unusual transactions.

BRIEF DESCRIPTION

In one aspect, a method of authenticating an accountholder for a payment transaction conducted by the accountholder with a merchant is provided. The method is implemented using an authentication computing device in communication with a memory device. The method includes receiving a decline message from an issuer computing device via a transaction message channel, wherein the decline message indicates that a first payment transaction initiated by the accountholder was declined by an issuer associated with the issuer computing device, and wherein the issuer issued an account to the accountholder. The method also includes transmitting an authorization rules relaxation message to an accountholder computing device operated by the accountholder, wherein the authorization rules relaxation message is transmitted via an authentication message channel that is separate from the transaction message channel, wherein the authorization rules relaxation message prompts the accountholder to request authorization rules relaxation. The method further includes receiving, from the accountholder computing device, an authorization rules relaxation response message via the authentication message channel. The method also includes authenticating the authorization rules relaxation response message as originating from the accountholder. The method further includes receiving an authorization request message associated with a second payment transaction initiated by the accountholder at the merchant, wherein the second payment transaction represents a reattempt of the first payment transaction. The method also includes enhancing the authorization request message by inserting a rules relaxation identifier into the authorization request message. The method further includes providing the enhanced authorization request message to the issuer computing device, causing the issuer computing device to modify one or more transaction decline systems. The method also includes receiving an approval message from the issuer computer device, the approval message denoting relaxation of one or more authorization rules and acceptance of the second payment transaction by the issuer.

In another aspect, a system for authenticating an accountholder for a payment transaction conducted by the accountholder with a merchant is provided. The system includes a memory device configured to store authentication data and an authentication computing device in communication with the memory device. The authentication computing device is configured to receive a decline message from an issuer computing device via a transaction message channel, wherein the decline message indicates that a first payment transaction initiated by the accountholder was declined by an issuer associated with the issuer computing device, and wherein the issuer issued an account to the accountholder. The authentication computing device is also configured to transmit an authorization rules relaxation message to an accountholder computing device operated by the accountholder, wherein the authorization rules relaxation message is transmitted via an authentication message channel that is separate from the transaction message channel, wherein the authorization rules relaxation message prompts the accountholder to request authorization rules relaxation. The authentication computing device is further configured to receive, from the accountholder computing device, an authorization rules relaxation response message via the authentication message channel. The authentication computing device is also configured to authenticate the authorization rules relaxation response message as originating from the accountholder. The authentication computing device is further configured to receive an authorization request message associated with a second payment transaction initiated by the accountholder at the merchant, wherein the second payment transaction represents a reattempt of the first payment transaction. The authentication computing device is also configured to enhance the authorization request message by inserting a rules relaxation identifier into the authorization request message. The authentication computing device is further configured to provide the enhanced authorization request message to the issuer computing device, causing the issuer computing device to modify one or more transaction decline systems. The authentication computing device is also configured to receive an approval message from the issuer computer device, the approval message denoting relaxation of one or more authorization rules and acceptance of the second payment transaction by the issuer.

In yet another aspect, a non-transitory computer readable medium that includes computer executable instructions for authenticating an accountholder for a payment transaction conducted by the accountholder with a merchant is provided. When executed by an authentication computing device comprising a processor in communication with a memory device, the computer executable instructions cause the authentication computing device to receive a decline message from an issuer computing device via a transaction message channel, wherein the decline message indicates that a first payment transaction initiated by the accountholder was declined by an issuer associated with the issuer computing device, and wherein the issuer issued an account to the accountholder. The computer executable instructions also cause the authentication computing device to transmit an authorization rules relaxation message to an accountholder computing device operated by the accountholder, wherein the authorization rules relaxation message is transmitted via an authentication message channel that is separate from the transaction message channel, wherein the authorization rules relaxation message prompts the accountholder to request authorization rules relaxation. The computer executable instructions further cause the authentication computing device to receive, from the accountholder computing device, an authorization rules relaxation response message via the authentication message channel. The computer executable instructions also cause the authentication computing device to authenticate the authorization rules relaxation response message as originating from the accountholder. The computer executable instructions further cause the authentication computing device to receive an authorization request message associated with a second payment transaction initiated by the accountholder at the merchant, wherein the second payment transaction represents a reattempt of the first payment transaction. The computer executable instructions also cause the authentication computing device to enhance the authorization request message by inserting a rules relaxation identifier into the authorization request message. The computer executable instructions further cause the authentication computing device to provide the enhanced authorization request message to the issuer computing device, causing the issuer computing device to modify one or more transaction decline systems. The computer executable instructions also cause the authentication computing device to receive an approval message from the issuer computer device, the approval message denoting relaxation of one or more authorization rules and acceptance of the second payment transaction by the issuer.

BRIEF DESCRIPTION OF THE DRAWINGS

FIG. 1 is a schematic diagram illustrating an example multi-party payment processing system for authorizing payment card transactions in which parties provide processing services to various financial entities.

FIG. 2 is a block diagram of an example accountholder authentication environment for enabling an accountholder to request a relaxation of authorization rules, in which a variety of computing devices are communicatively coupled to each other via a plurality of network connections.

FIG. 3 illustrates an example configuration of a server system that includes the accountholder authentication computing device for requesting authorization rules relaxation shown in FIG. 2.

FIG. 4 illustrates an example configuration of a user system, such as an accountholder computer device configured to request a relaxation of authorization rules.

FIG. 5 shows an example configuration of a server system, such as an authentication computing device configured to authenticate an accountholder and request a relaxation of authorization rules.

FIG. 6 shows an example message flow illustrating how the authentication computing device authenticates an accountholder following a prior registration for proactive authorization rules relaxation.

FIG. 7 shows an example message flow illustrating how the authentication computing device authenticates an accountholder during a transaction where the accountholder re-initiates the transaction following request for relaxation of authorization rules.

FIG. 8 shows an example message flow illustrating how the authentication computing device authenticates an accountholder during a transaction where the accountholder does not re-initiate the transaction.

FIG. 9 shows an example method flow by which the authentication computing device authenticates an accountholder and requests a relaxation of authorization rules.

FIG. 10 shows an example configuration of a database associated with the authentication computing device that, along with other related computing components, may be used to authenticate an accountholder and request a relaxation of authorization rules.

Like numbers in the Figures indicate the same or functionally similar components.

DETAILED DESCRIPTION

Figure 1:
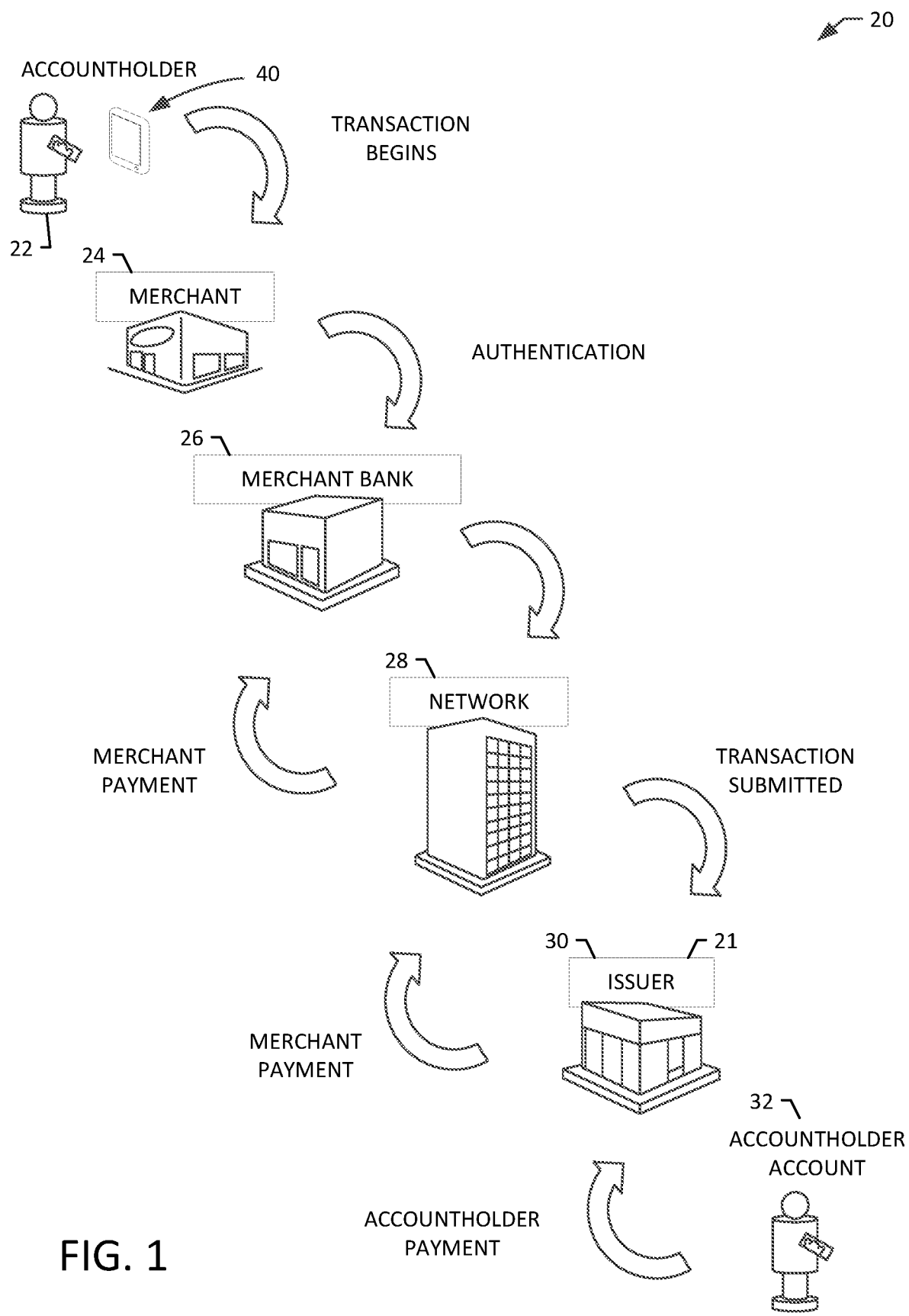
FIGS. 1-10 show example embodiments of the methods and systems described herein.

The present disclosure relates to an authentication computing device. The authentication computing device is configured to enable an accountholder to authenticate during a transaction that is being performed with a merchant computing device (e.g., a point of sale device at a merchant) and be able to retry the transaction successfully. The authentication computing device is also configured to request relaxation of authorization rules enforced by an issuer so as to enable the accountholder to successfully run the transaction the first time or on a retry. The authentication computing device enables the accountholder to do so proactively (in advance of the transaction) or reactively (during or after the first transaction attempt). In at least some implementations, the authentication computing device is in communication with a merchant computing device and the accountholder computing device. Additionally, the authentication computing device may operate in conjunction with a payment processor computing device that processes transactions.

In the exemplary embodiment, an authorized accountholder attempts (with a merchant point of sale (POS) computing device) a transaction that is declined for failure to satisfy an authorization rule. The authorization rule is set by the issuer of the account being used. The authentication computing device receives a decline message from the issuer and transmits a message to the accountholder's computing device suggesting that the accountholder can retry the transaction if the accountholder provides additional authentication data to authenticate the accountholder to the authentication computing device. Accordingly, the accountholder provides the additional authentication data via the accountholder's computing device and reattempts the transaction via the merchant POS computing device.

When the transaction is reattempted, the authentication computing device is configured to determine that the accountholder provided additional authentication data and is reattempting the transaction. The authentication computing device is configured to transmit transaction data from the reattempted transaction data to the issuer that set the authorization rule(s) and direct the issuer computing device to relax, for a limited time, the authorization rule(s) that prompted the decline. At this point, the reattempted transaction is not declined and is processed by the issuer computing device.

In at least some implementations, the authentication computing device receives transaction data as it is transmitted between the accountholder computing device and the merchant computing device. More specifically, the authentication computer device may receive the transaction data from a payment processor computing device that processes the transaction data as it is transmitted between the accountholder computing device and the merchant computing device. A first transaction (or original transaction) may involve the accountholder computing device interacting with the merchant computing device to initiate the first transaction. In other implementations, the authentication computing device receives transaction data that is generated when an accountholder uses a payment card (such as a physical plastic card) to perform a transaction. The merchant computing device generates an authorization request message that includes transaction data (transaction date/time, transaction amount or the like), authorization data (account number, expiration date, or the like) and authentication data (security codes such as 3-digit card verification code (CVC), accountholder computing device identifiers, or the like). The merchant computing device transmits the authorization request message to the payment processor computing device (and associated authentication computing device) which further transmits it to the issuer computing device.

In at least some implementations, issuer computing devices are configured to decline transactions with the use of one or more transaction decline systems. For example, an issuer computing device may operate a software program to filter, quarantine, block, or otherwise sanction an incoming transaction that is to be declined pursuant to one or more authorization rules. The authorization rules may indicate that transactions should be declined for fraud, lack of sufficient funds, and the like. In one embodiment, a transaction may be declined because it was part of a sequence of transactions in a very short period of time. Several transaction attempts in quick succession may indicate that an unauthorized user is using payment card account information at different merchants, or repeatedly at the same merchant in an attempt to purchase goods or services. Exceeding the daily limit for a transaction or sum of transactions, may trigger a decline. Being in a different geographic location than the issuer expects the accountholder to be may trigger a decline, as may any other transactions that are out of character for the accountholder.

When the payment transaction is declined (e.g., due to repeat transactions in a short time) by an issuer computing device associated with an issuer, the payment processor computing device receives a decline message from the issuer computing device. The authentication computing device is configured to detect the decline message and determine that the payment transaction was declined and the reason for the decline (e.g., by interpreting a reason code included within the decline message).

In at least some implementations, the accountholder registers for an authorization rules relaxation program with the authentication computing device. Under this program, the accountholder will request that the authentication computing device cause the issuer to relax one or more authorization rules in order to approve transactions that may otherwise be declined. In one embodiment, to facilitate the transaction approval, the accountholder also consents to provide additional authentication data. Additional authentication data is used to prove to the authentication computing device and the issuer that the accountholder is the authorized accountholder with authority to request that the authorization rules be relaxed and not an unauthorized person attempting the transaction.

Upon receiving the decline, the authentication computing device may proceed in at least one of two ways. In one embodiment, the authentication computing device forwards the decline message to the accountholder computing device and the merchant computing device such that the transaction is completed as a declined transaction, and the accountholder must reattempt the transaction. In another embodiment, the authentication computing device does not forward the decline message to the merchant. Rather, it requests the accountholder to provide additional authentication data using the accountholder computing device in order to complete the original transaction but with additional data.

In the embodiment where the accountholder must reattempt the transaction as a new transaction, the authentication computing device forwards the decline message to the accountholder computing device as described above (e.g., directly to the accountholder computing device). A display message may appear on the accountholder computing device explaining the reason for the decline (e.g., "Potentially fraudulent transaction detected due to too many transactions in short time frame"). As a result, the transaction is completed and the accountholder must decide whether to retry the transaction. Moreover, the accountholder may determine from the display message that the transaction was declined due to the strictness of authorization rules but that a reattempted transaction with additional authentication data and a request to relax the rules may be accepted.

Additionally, the authentication computing device is configured to generate and transmit an authorization rules relaxation message (also referred to herein as an additional authentication data request message) to the accountholder computing device. In at least some implementations, the authentication computing device transmits the authorization rules relaxation message via an electronic message channel separate from the transaction message channel (e.g., via an SMS message sent to a mobile device). By the authorization rules relaxation message, the authentication computing device requests additional authentication data from the accountholder. Additional authentication data (e.g., biometric data, passcodes, geographic location data, or the like) serves to confirm the accountholder's identity, especially in cases where the issuer declined the initial payment transaction on suspicion of fraud. For example, the accountholder may provide confirmation of the accountholder's identity by consenting to transmission, to the authentication computing device, of biometric data stored on the accountholder computing device. Given the consent, the authentication computing device is configured to retrieve additional authentication data from the accountholder computing device.

Using the additional authentication data, the authentication computing device is configured to authenticate the accountholder. In at least some implementations, authenticating the accountholder includes comparing the received additional authentication data with stored additional authentication data associated with the accountholder. The accountholder provides one or more items of authentication data during a registration process with the authentication computing device. (e.g., comparison of cryptographic representation of a received fingerprint image with a stored cryptographic representation for a fingerprint for the accountholder provided, for example, during a registration process).

The accountholder uses the accountholder computing device to provide additional authentication data to the authentication computing device in addition to any standard authentication data that was provided in the original transaction attempt. Also, the accountholder reattempts the transaction by causing the accountholder computing device to interact with the merchant computing device (e.g., by inserting, tapping, swiping, etc.). The merchant computing device generates a second authorization request message and transmits it to the payment processor computing device. The authentication computing device detects this second authorization request message and determines that it corresponds to the additional authentication data provided from the accountholder computing device. For example, in the same time frame, the accountholder may have performed another transaction that does not trigger a decline due to an authorization rule (e.g., a single low-value transaction).

Accordingly, the authentication computing device correlates (e.g., using a memory device) the additional authentication data received from the accountholder computing device and the transaction data received from the merchant computing device. Validation results in the authentication computing device generating a validation confirmation for the issuer computing device directing the issuer computing device to relax the authorization rules for a predefined time window and approve the transaction because the additional authentication data was validated. Then the second authorization request message is transmitted to the issuer computing device, which authorizes the transaction.

The other embodiment is where the accountholder does not reattempt the transaction a second time but receives a request from the authentication computing device to authenticate and complete the original transaction. The authentication computing device is configured to generate and transmit the authorization rules relaxation message (also referred to herein as an additional authentication data request message) to the accountholder computing device. In at least some implementations, the authentication computing device transmits the authorization rules relaxation message via an electronic message channel separate from the transaction message channel.

After the authentication computing device has authenticated the accountholder, the authentication computing device appends the additional authentication data to the authorization request message provided by the merchant computing device. In one embodiment, the authentication computing device creates an authorization request message as a result. The authentication computing device then transmits the authorization request message to the issuer computing device to complete the original transaction. In at least some implementations, this involves reformatting the received additional authentication data into an authorization request message format, and combining it with transaction data for the payment transaction. In other implementations, the authentication computing device may generate an authentication confirmation notice, confirming that the accountholder has been authenticated. The authentication computing device may combine the transaction data with the authentication confirmation notice in lieu of the additional authentication data. The authentication computing device is configured to then transmit the authorization request message to the issuer computing device. In still other implementations, the issuer computing device will consider any authorization request message received from the authentication computing device as being authentic.

However, where the authentication computing device has authenticated the accountholder, as described previously, the issuer computing device will consider the authorization request message as originating from the authentication computing device as being legitimate. The authorization request message enables the issuer computing device to determine that the accountholder has been authenticated and relax the authorization rules. As a result, the issuer computing device modifies its transaction decline system (e.g., to relax one or more fraud scoring rules) and consider the transaction as originating from the authorized accountholder.

In other implementations, the authentication computing device is configured to cause the issuer computing device to proactively relax the authorization rules for a limited time even before a transaction is attempted. In such implementations, an accountholder may request permission to perform transactions that may not otherwise be approvable. For example, even before any transactions have been conducted, the accountholder may know that the accountholder will visit several merchants in quick succession in the immediate future (e.g., at a large shopping mall). The accountholder uses the accountholder computing device to transmit an authorization rules relaxation response message to the authentication computing device. In at least some implementations, the authorization rules relaxation response message is customizable by the accountholder. The authentication computing device may be configured to cause an application (e.g., an electronic wallet application) on the accountholder computing device to provide a menu of various acceptable authorization rules relaxation requests (e.g., "do not consider multiple transactions as fraud," "permit transactions over $1000," "permit transactions outside my usual geographic area," or the like).

The authentication computing device is configured to receive the authorization rules relaxation response message and also retrieve the additional authentication data from the accountholder computing device. The authentication computing device authenticates the accountholder using the additional authentication data. The authentication computing device combines the authorization rules relaxation response message and the additional authentication data and reformats the combination into the authorization request message as described above. The authentication computing device is then configured to transmit the authorization request message to the issuer computing device, prompting the issuer computing device to consider the authorization rules relaxation request and relax the authorization rules.

The claimed systems and methods allow the issuer computing device to be more predisposed to accept this proactive authorization rules relaxation request because the accountholder is providing additional authentication data that is likely to be stored only on the accountholder computing device (e.g. fingerprint recognition data). The accountholder computing device may be registered with the authentication computing device via an installed electronic wallet application. Additionally, the authentication computing device has authenticated the accountholder and the authentication computing device is likely to be trusted by the issuer computing device.

In another embodiment, the authentication computing device receives the authorization rules relaxation response message and instructs the issuer computing device to proactively relax its authorization rules without providing additional authentication data. The issuer computing device is configured to relax its transaction processing rules for a limited time as per the accountholder's provided parameters.

The technical problems addressed by this system include at least one of: (i) inability of payment processing systems to timely receive authentication data that may authenticate a user during a transaction, (ii) inability of accountholder computing devices to transmit otherwise available authentication data in order to complete a transaction, (iii) wasted computer processing and network traffic generated as a result of declines for transactions made by authorized accountholders, and (iv) inability of issuer computing devices to update their transaction processing systems in a timely manner in order to approve reattempted transactions by a legitimate accountholder.

The methods and systems described herein may be implemented using computer programming or engineering techniques including computer software, firmware, hardware, or any combination or subset thereof, wherein the technical effects may be achieved by a) receiving a decline message from an issuer computing device via a transaction message channel, wherein the decline message indicates that a first payment transaction initiated by the accountholder was declined by an issuer associated with the issuer computing device, wherein the issuer issued an account to the accountholder, b) transmitting an authorization rules relaxation message to an accountholder computing device operated by the accountholder, wherein the authorization rules relaxation message is transmitted via an authentication message channel that is separate from the transaction message channel, and wherein the authorization rules relaxation message prompts the accountholder to request authorization rules relaxation, c) receiving, from the accountholder computing device, an authorization rules relaxation response message via the authentication message channel, d) authenticating the authorization rules relaxation response message as originating from the accountholder, e) receiving an authorization request message associated with a second payment transaction initiated by the accountholder at the merchant, wherein the second payment transaction represents a reattempt of the first payment transaction, f) enhancing the authorization request message by inserting a rules relaxation identifier into the authorization request message, g) providing the enhanced authorization request message to the issuer computing device, causing the issuer computing device to modify one or more transaction decline systems, and h) receiving an approval message from the issuer computer device, the approval message denoting relaxation of one or more authorization rules and acceptance of the second payment transaction by the issuer.

The resulting technical benefits achieved by this system include at least one of: (i) new and improved usage of existing authentication data stored on an accountholder computing device, (ii) improved electronic transaction processing involving fewer declines, thereby leading to decreases in unnecessary network traffic and computer processing, (iii) generation of useful data for issuer computing devices and merchant computing devices, where issuers and merchants can better predict fraudulent activity by more accurately identifying non-fraudulent accountholder activity, (iv) ability of issuers and merchants to authenticate authorized accountholders for potentially fraudulent transactions without the need for additional computer infrastructure, (v) leveraging more secure message channels for transmitting authentication data between accountholder and payment processor computer devices.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment processing system 20 for authorizing payment card transactions in which parties provide processing services to various financial entities. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In a typical transaction card system, a financial institution called the "issuer" issues a transaction card, such as a credit card, to the accountholder or accountholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." In one embodiment, accountholder 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads accountholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether accountholder 22's account 32 is in good standing and whether the purchase is covered by accountholder 22's available credit line. Based on these determinations, the request for authorization will be declined or accepted. If the request is accepted, an authorization code is issued to merchant 24.

When a request for authorization is accepted, the available credit line of accountholder 22's account 32 is decreased. Normally, a charge for a payment card transaction is not posted immediately to accountholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If accountholder 22 cancels a transaction before it is captured, a "void" is generated. If accountholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, accountholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, accountholder 22, merchant 24, merchant bank 26, interchange network 28 (also referred to herein as payment processor 28), issuer bank 30, and/or an issuer processor 21.

Figure 2:
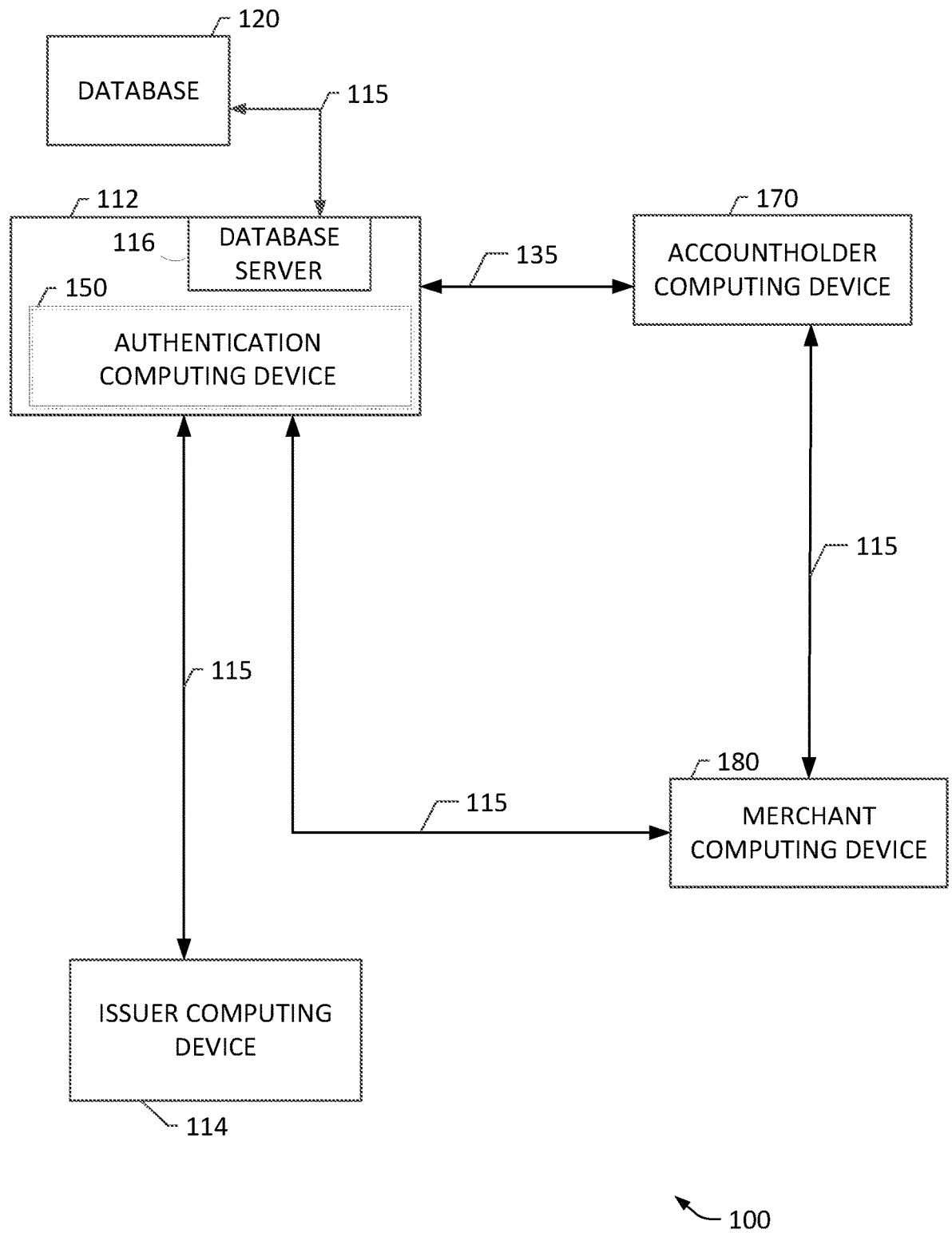

FIG. 2 is a block diagram of an example accountholder authentication environment for enabling an accountholder to request a relaxation of authorization rules, in which a variety of computing devices are communicatively coupled to each other via a plurality of network connections. These network connections may be Internet, LAN/WAN, or other connections capable of transmitting data across computing devices. Environment 100 shows an authentication computing device 150 and a database server 116. In one embodiment, authentication computing device 150 and database server 116 are components of an authentication system 112. Server system 112 may be a server, a network of multiple computer devices, a virtual computing device, or the like. Authentication computing device 150 is connected to at least one accountholder computing device 170, a merchant computing device 180, and an issuer computing device 114 via at least a network connection 115 and network connection 115.

In one embodiment, authentication computing device 150 is configured to receive transaction data from merchant computing device 180, over a network connection 115. As noted with respect to FIG. 1, when an accountholder performs a transaction at a merchant location, transaction data is generated. Transaction data may be transmitted across computer devices as a transaction data message. In one embodiment, when an accountholder performs a transaction at merchant computing device 180 associated with a merchant, transaction data for the transaction is transmitted to server system 112. Server system 112 processes the transaction data in the manner described with respect to FIG. 1 and also provides it to authentication computing device 150. Authentication computing device 150 is also configured to communicate with accountholder computing device 170 via an electronic message channel or method that is distinct from one used to communicate transaction data. In the example embodiment, authentication computing device 150 is configured to communicate with accountholder computing device 170 via electronic message channel 135 (also referred to herein as an "authentication message channel" or "electronic message channel"). For example, electronic message channel 135 may be a push notification delivered to accountholder computing device 170 or a website or software application where accountholder computing device 170 can be used to view notifications or alerts, or the like.

The transaction data message may also include a transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the accountholder, or the like. In one embodiment, the transaction data message also includes standard authentication data. As used herein, standard authentication data refers to data such as an account identifier, a security code (e.g., 3-digit card verification code (CVC)), accountholder computing device identifier, or the like. In one embodiment, standard authentication data is distinct from additional authentication data (described in greater detail with respect to FIGS. 6 and 7). Authentication computing device 150 is configured to extract standard authentication data from transaction data and process it for transmission to issuer computing device 114. In one embodiment, authentication computing device 150 parses the complete transaction data file searching for, filtering, or otherwise extracting standard authentication data. For example, authentication computing device 150 may determine after parsing the complete transaction data file that it contains a 3-digit CVC.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store authentication data for each accountholder in communication with authentication computing device 150.

In the example embodiment, authentication computing device 150 does not consist of generic computer hardware, nor does it require merely generic computer instructions to perform the above functions. Rather, authentication computing device 150 is a specially designed and customized computer device built to perform the specific function of authenticating an accountholder during a transaction by receiving authentication data from accountholder computing devices, processing those inputs, and generating outputs (e.g., authorization request messages) that are transmitted to other computing devices (e.g., issuer computing devices).

Figure 3:
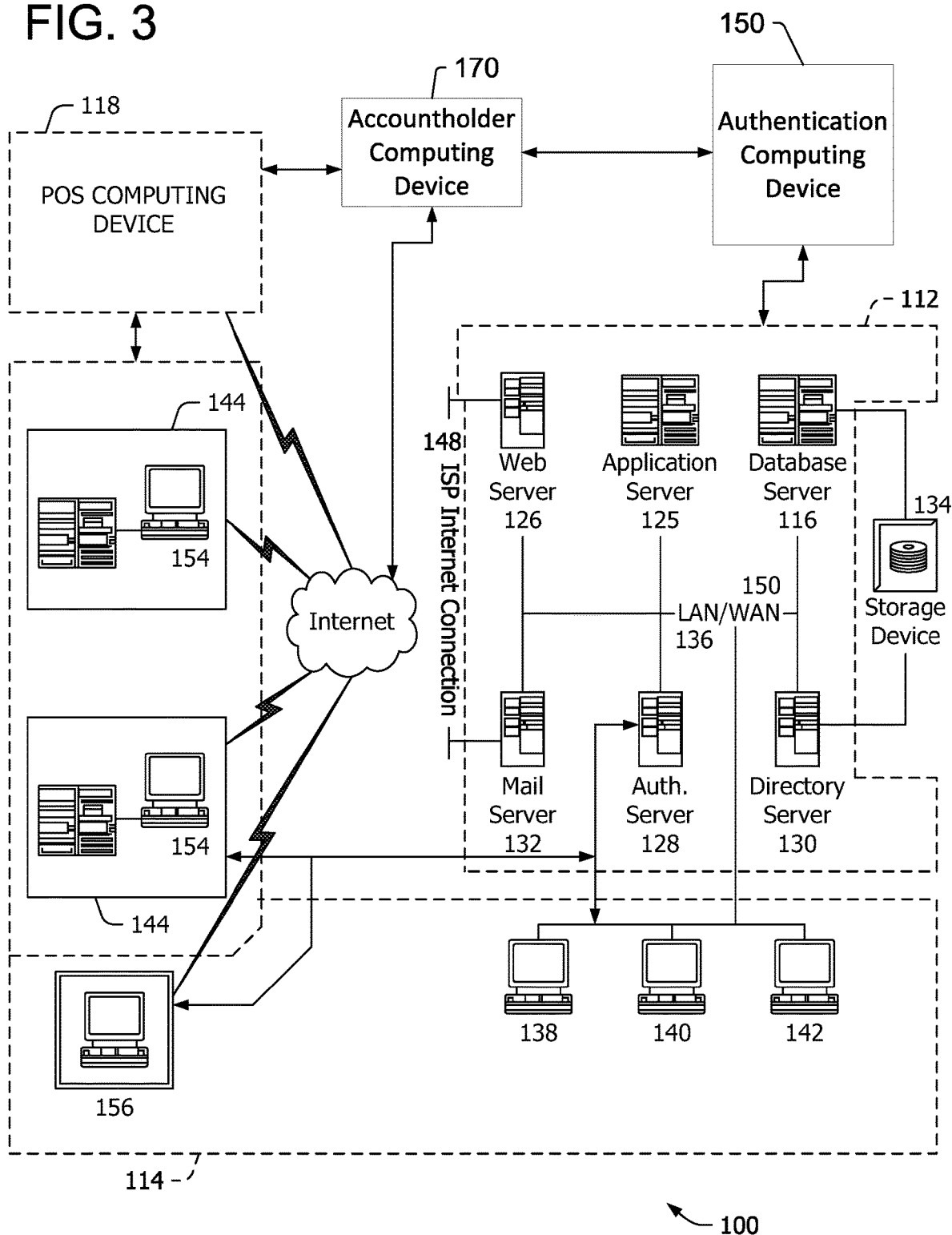

FIG. 3 illustrates an example configuration of a server system that includes the accountholder authentication computing device for requesting authorization rules relaxation shown in FIG. 2. Components in computer system 100, identical to components of environment 100 (shown in FIG. 2), are identified in FIG. 3 using the same reference numerals as used in FIG. 2. Computer system 100 includes server system 112 (similar to authentication computing device 150, shown in FIG. 2. Server system 112 further includes database server 116, a web server 126, a user authentication system 106, and an application server 125. A storage device 134 is coupled to database server 116. Servers 116, 124, 126, 128, 130, and 132 are coupled in a local area network (LAN) 136. In addition, an issuer bank workstation 138 (similar to issuer computing device 114 shown in FIG. 2), acquirer bank workstation 140, and a third party processor workstation 142 may be coupled to LAN 136. A point of sale (POS) computing device 118 is associated with a merchant and interacts with accountholder computing device 170 during a transaction to generate transaction data. The transaction data is received and processed by server system 112 (e.g., in the form of an authorization request message).

In the example embodiment, issuer bank workstation 138, acquirer bank workstation 140, and third party processor workstation 142 are coupled to LAN 136 using network 115. Workstations 138, 140, and 142 are coupled to LAN 136 using an Internet link or are connected through an Intranet. In the example embodiment, authentication computing device 150 is in communication with issuer bank workstation 138 and accountholder computer device 124. Accountholder computer device 170 is also connected to the Internet and may be a smartphone, personal computer, tablet computer, or similar computing device. Authentication computing device 150 is configured to receive authentication data from accountholder computing device 170 via server system 112, process the authentication data and transmit it to issuer bank workstation 138.

Each workstation 138, 140, and 142 is a computer with Internet access. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees and third parties 144 (e.g., account holders, customers, auditors, developers, cardholders, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet.

In the example embodiment, any authorized individual having a workstation 154 can access computer system 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
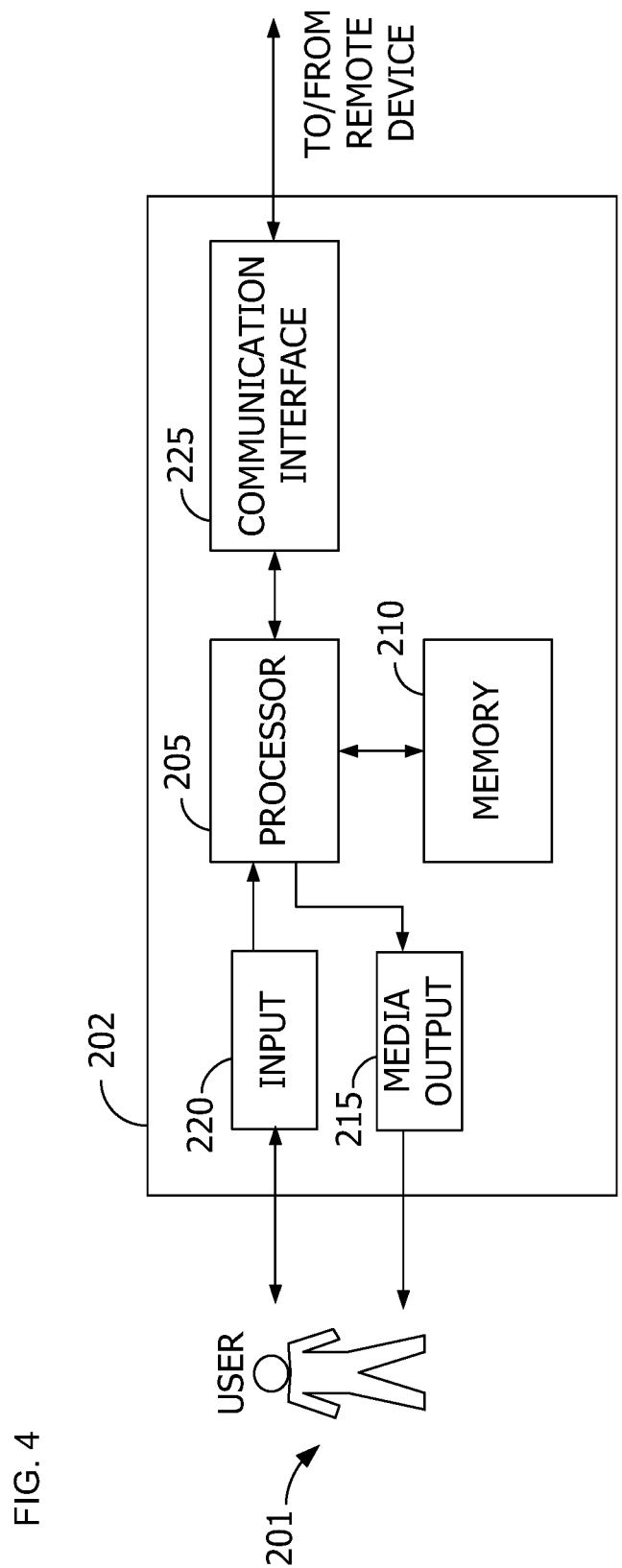

FIG. 4 illustrates an example configuration of a user system, such as an accountholder computer device configured to request a relaxation of authorization rules. User system 202 may include, but is not limited to, accountholder computing device 170. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as Server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server system 112. A client application allows user 201 to interact with a server application from server system 112.

Figure 5:
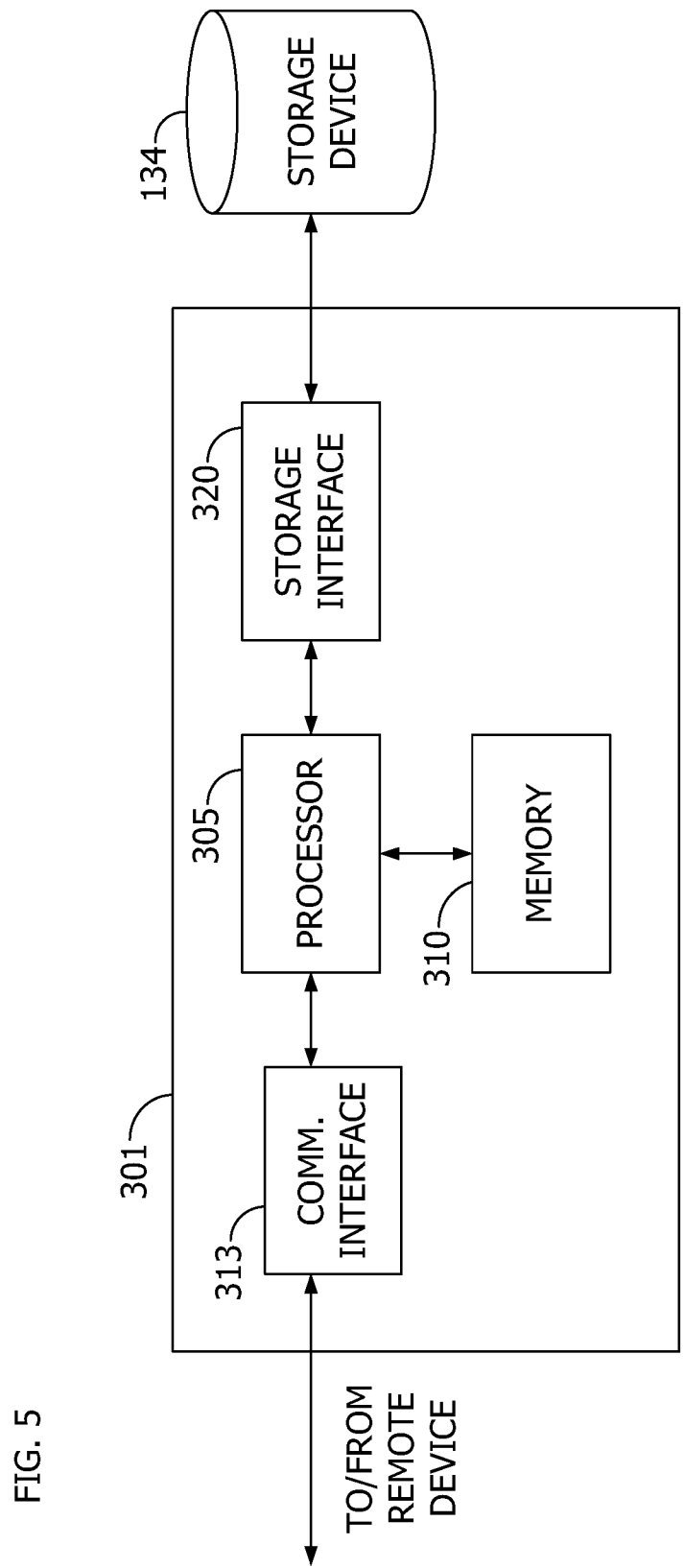

FIG. 5 shows an example configuration of a server system, such as an authentication computing device (shown in FIG. 2) configured to authenticate an accountholder and request a relaxation of authorization rules. Server system 301 may include, but is not limited to, database server 116 or authentication computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
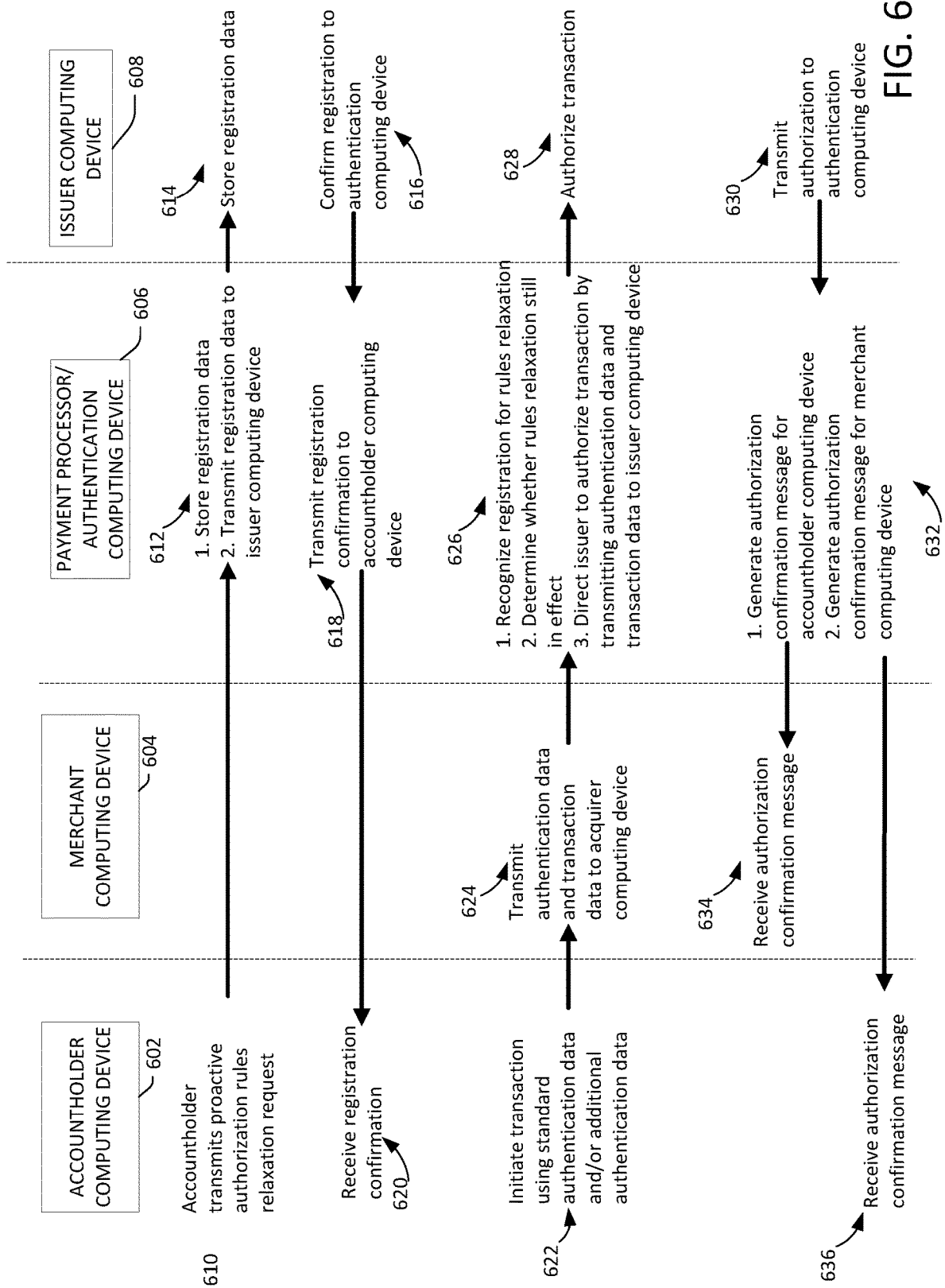
Figure 7:
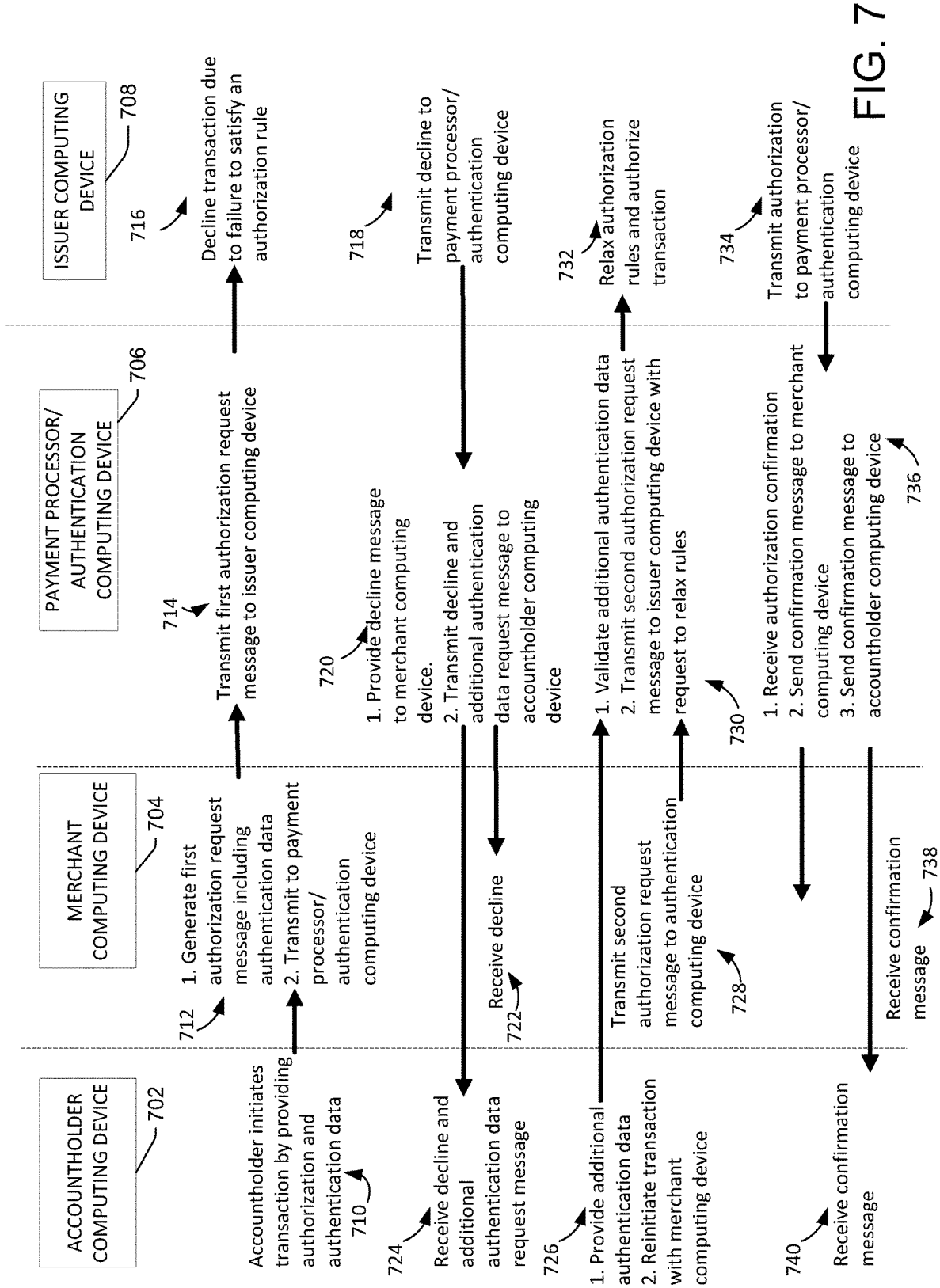
Figure 8:
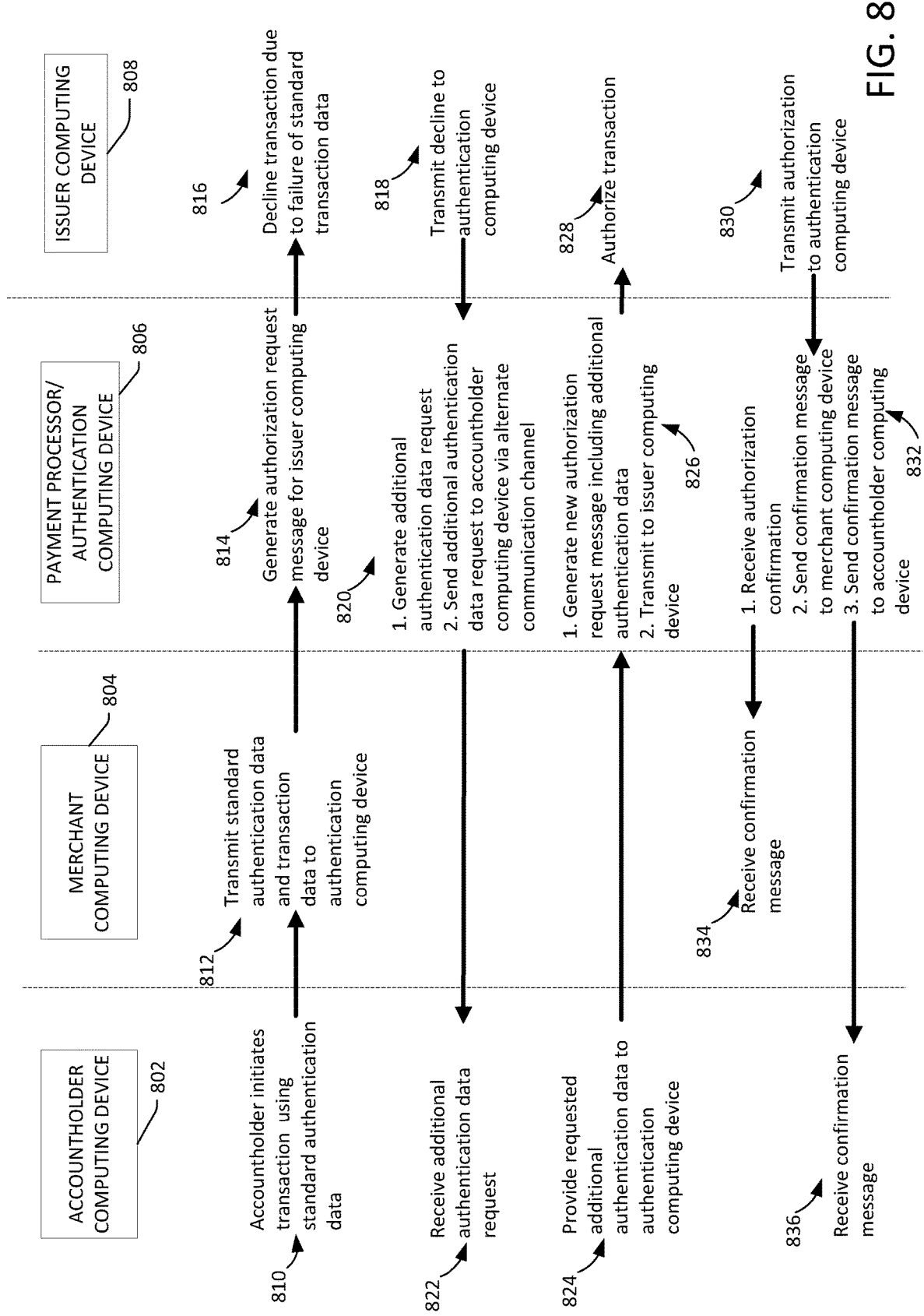

FIGS. 6-8 describe various exemplary embodiments by which authentication computing device 150 will authenticate an accountholder. As described above, an accountholder will register for an authorization rules relaxation program with authentication computing device 150 (and/or server system 112 that may be associated with a payment processing network). As described in greater detail below, FIG. 6 shows how an accountholder registers for the authorization rules relaxation program and performs a transaction that would otherwise be declined. FIG. 6 describes how the accountholder provides specific parameters for anticipated transactions. These parameters are stored by authentication computing device 150 and tested when the accountholder performs a transaction to see whether authentication computing device 150 should inform the issuer that the transaction should be approved.

As described in greater detail below, FIG. 7 shows how authentication computing device 150 enables an accountholder to reattempt a transaction while at a merchant location. As described with respect to FIG. 7, the authentication computing device prompts an accountholder to provide additional authentication data when the transaction is first declined. When the transaction is reattempted, the accountholder provides additional authentication data which prompts the issuer to determine that the accountholder is legitimate and that the transaction should be approved.

As described in greater detail below, FIG. 8 shows how authentication computing device 150 enables an accountholder to provide additional authentication data to authenticate during a transaction without the transaction being first declined. As described with respect to FIG. 8, authentication computing device 150 prompts the accountholder to provide the additional authentication data via a separate message channel from a transaction message channel being used to run the transaction itself.

FIG. 6 shows an example message flow illustrating how the authentication computing device (similar to authentication computing device 150 shown in FIG. 2) authenticates an accountholder following a prior registration for proactive authorization rules relaxation. As shown in FIG. 6, an accountholder may wish to initiate transactions that could be considered fraudulent (e.g., transactions initiated while traveling to the country that is not the accountholder's country of residence). Accordingly, the accountholder registers for proactive authorization rules relaxation by transmitting 610 a proactive authorization rules relaxation request to authentication computing device 606. In one embodiment, the proactive authorization rules relaxation request includes registration data such as standard authentication data (as described with request to FIG. 6), additional authentication data (as described with request to FIG. 6), a rules relaxation start date/time, a rules relaxation end date/time, rules relaxation parameter data, and the like.

More specifically, rules relaxation parameter data includes data such as the type of transaction relaxation being requested. For example, accountholder may use accountholder computing device 602 to select from a list of transaction types including "travel," "frequency," "high value," and "current transaction." Using the "travel" transaction type may indicate that the accountholder is traveling and will initiate transactions outside his or her home country, city, or domicile in general. Use of the "frequency" transaction type may indicate that the accountholder intends to initiate a certain number of transactions very close in time. For example, the accountholder may be buying multiple gifts in a single store visit and may wish to receive gift receipts for each gift without waiting some prescribed period of time before bringing each gift to merchant computing device 604. Using the "high value" transaction type may indicate that accountholder is about to purchase a costly item, or initiate a transaction for higher value than a predetermined daily limit, or initiate a transaction for value higher than ever before, or the like. "Current transaction" may indicate that the accountholder wishes for fraud rules not to apply for the current transaction, based on an accountholder belief that the transaction may be declined. One or more of the above transaction types may be selected in combination. For example, the accountholder may wish to purchase a high value item while traveling abroad and thus may use both the "travel" and the "high value" transaction type.

In the exemplary embodiment, rules relaxation parameter data also includes identifiers for detail on each transaction type. "Travel detail" may include 1 to 5 latitude/longitude coordinate pairs defining northeastern and southwestern corners of approved geographic locations. Each pair is delimited by a '|' character with a closing '||'. "Frequency detail" may include a number of transactions expected to be initiated during the relaxation period. "High value detail" may include, for example, a 3-digit currency code followed by up to a 10-digit amount value left-justified padded with spaces. "Current transaction detail" may include a transaction identifier defining the individual transaction that is expected to be declined but for the rules relaxation. In other embodiments, rules relaxation parameter data may include different data or include data that is formatted differently from those of the exemplary embodiment described above.

Authentication computing device 606 is configured to receive the proactive authorization rules relaxation request, store the registration data, and transmit the registration data 612 to issuer computing device 608. Issuer computing device 608 stores the registration data at 614 and transmits 616 a registration confirmation message to authentication computing device 606. Authentication computing device 606 receives the registration confirmation and transmits it 618 to accountholder computing device 602, which receives it at 620. In an alternate embodiment, accountholder computing device 602 receives the registration confirmation message directly from issuer computing device 608. At 622, the accountholder initiates a transaction from accountholder computing device 602. The transaction may include standard authentication data, additional authentication data, or a combination of both. Accountholder computing device 602 transmits the standard and/or additional authentication data to merchant computing device 604. Merchant computing device 604 generates transaction data and transmits 624 the standard and/or additional authentication data plus the transaction data to authentication computing device 606. As described above with respect to FIG. 6, merchant computing device 604 may transmit the standard and/or additional authentication data and transaction data to authentication computing device 606 directly or via an acquirer computing device (not shown).

Authentication computing device 606 is configured to receive 626 the transmission from merchant computing device 604 and recognize that the accountholder initiating this transaction has previously registered for proactive authorization rules relaxation. In one embodiment, authentication computing device 606 recognizes the registration by comparing an accountholder identifier from standard authentication data (e.g., accountholder name) to registration data received and stored from the proactive authorization rules relaxation request. In another embodiment, authentication computing device 606 is configured to parse the additional authentication data in order to 1) determine that this accountholder has previously registered for proactive authorization rules relaxation and 2) authenticate the accountholder using the additional authentication data. For example, authentication computing device 606 may compare fingerprint recognition data included within the transmission from merchant computing device 604 to fingerprint recognition data from within the received registration data and thus authenticate the accountholder.

Authentication computing device 606 is also configured to reformat data received from the proactive authorization rules relaxation request and provide it to issuer computing device 608 (e.g., as an advice message). In one embodiment, authentication computing device 606 is configured to authenticate the accountholder based on data from the proactive authorization rules relaxation request and then embed the data within an advice message. In another embodiment, authentication computing device 606 includes a flag within the advice message notifying issuer computing device that the accountholder has been authenticated.

Authentication computing device 606 is configured to determine whether the proactive authorization rules relaxation is still in effect. For example, authentication computing device 606 may compare the current transaction date to the rules relaxation end date/time from the registration data previously received. Authentication computing device 606 is further configured to determine whether proactive rules relaxation must be applied to this transaction. For example, authentication computing device 606 may determine that while the accountholder is registered for proactive authorization rules relaxation, the current transaction does not require rules relaxation. For example, the current transaction may be of a low value and not be potentially fraudulent. If proactive authorization rules relaxation is still in effect and must be applied to the transaction, authentication computing device 606 directs issuer computing device 608 to authorize the transaction by transmitting the standard and/or additional authentication data and transaction data to issuer computing device 608.

Issuer computing device 608 receives the standard and/or additional authentication data and transaction data and determines that the transaction should be authorized. Issuer computing device 608 determines that, based at least on the additional authentication data, the individual attempting the transaction is the authorized accountholder even if the transaction appears unauthorized (e.g., where the transaction exceeds a daily amount limit or originates from an unauthorized location). Issuer computing device 608 relaxes one or more authorization rules in order to authorize the transaction. In one embodiment, issuer computing device 608 disables or modifies certain transaction processing systems that would otherwise decline the transaction. For example, software code that tests for certain conditions in the transaction data is stopped from running or code parameters are altered in order to permit the transaction from proceeding.

Issuer computing device 608 authorizes 628 the transaction and transmits 630 the transaction to authentication computing device 606. Optionally, authentication computing device 606 is configured to generate 632 an authorization confirmation message for the merchant computing device 604 and the accountholder computing device 602. Merchant computing device 604 receives 634 the authorization confirmation message. Accountholder computing device 602 receives 636 the authorization confirmation message.

FIG. 7 shows an example message flow illustrating how the authentication computing device authenticates an accountholder during a transaction where the accountholder re-initiates the transaction following request for relaxation of authorization rules. As shown in FIG. 6, an accountholder initiates 710 a transaction using accountholder computing device 702. The transaction is initiated with merchant computing device 704 (e.g., by holding accountholder computing device 702 in the vicinity of merchant computing device 704).

In initiating the transaction, accountholder computing device 702 transfers to merchant computing device 704 one or more items of standard authentication data which is used to authenticate the accountholder and any associated account. As used herein, standard authentication data refers to data such as an account identifier, a security code (e.g., 3-digit card verification code (CVC)), accountholder computing device identifier, or the like. Merchant computing device 704 receives the standard authentication data. Merchant computing device 704 generates 712 a first authorization request message that includes the standard authentication data and transmits it and transaction data to authentication computing device 706. As used herein, transaction data may include payment card number, payment card expiration date, transaction amount, transaction date/time, merchant identifiers such as merchant name and location, product/service identifier(s), acquirer or issuer bank identifiers, and any other information relevant to the initiated transaction. In one embodiment, authentication computing device 706 receives the authorization request message directly from merchant computing device 704. In another embodiment, authentication computing device 706 receives the first authorization request message from merchant computing device 704 via an acquirer bank computing device (not shown) that is associated with an acquirer bank that may hold an account for the merchant.

Authentication computing device 706 receives the first authorization request message and transmits it 714 to issuer computing device 708. In one embodiment, issuer computing device 708 reviews the transaction data embedded within the first authorization request message and determines 716 that the transaction fails to satisfy an authorization rule. For example, issuer computing device 708 may be configured with one or more authorization rules or schema that dictate that authorization requests be declined if certain criteria are not met. The transaction time may be too close to the transaction time for an earlier transaction (e.g., within seconds), suggesting that an unauthorized user is attempting multiple consecutive transactions before the account is deactivated. Similarly, the issuer may decline a transaction if the merchant location is in a different country to the accountholder's country of residence. For example, the accountholder resides in the US, but the merchant location is London, England, which may suggest that that the transaction is being performed by an unauthorized user in London with access to the accountholder's information. Issuer computing device 708 tests the first authorization request message against the authorization rule(s), declines the transaction, and transmits 718 a decline message to authentication computing device 706.

Authentication computing device 706 receives the decline message and transmits it 720 to accountholder computing device 702 and merchant computing device 704. Merchant computing device receives 722 the decline message. Accountholder computing devices receives 724 a decline message as well. In one embodiment, the decline message includes details for the accountholder regarding the reason for the decline. For example, the decline message may include a reason code indicating fraud that is configured to be processed by accountholder computing device 702 in order to display a message stating, for example: "declined due to potential fraud associated with transaction. Please contact issuer for details."

In addition to the decline message, authentication computing device 706 transmits, to accountholder computing device 702, an additional authentication data request message, requesting the accountholder to provide additional authentication data in order to reattempt the transaction with authorization rules being relaxed at the issuer. The accountholder re-initiates the transaction at 726, this time also providing additional authentication data to authentication computing device 706. In another embodiment, authentication computing device transmits 720 the decline message and asks the accountholder to reattempt the transaction (but does not request additional authentication data).

As used herein, additional authentication data is authentication data that is captured by and/or stored on an accountholder computing device 702 and is not normally transmitted as part of standard authentication data or transaction data. Additional authentication data may be used, for example, to authenticate the accountholder to the accountholder computing device 702 (e.g., a passcode to unlock the accountholder computing device 702). In one embodiment, additional authentication data includes facial recognition data, fingerprint data, password or passcode data, retinal scan data, voice recognition data, gesture recognition data, or the like.

Additional authentication data may also include a device location identifier for the accountholder computing device 702. In one embodiment, the device location identifier includes a device location longitude identifier and a device location latitude identifier each stored as hexadecimally encoded degrees with 2 decimal places. Additional authentication data may further include a source IP address for accountholder computing device 702. In one embodiment, the source IP address is stored by authentication computing device 706 as a variable length masked IP address.

Additional authentication data may also include an issuer application identifier (e.g., where the accountholder is using an issuer bank application for the transaction), or even an issuer customer representative identifier (e.g., where the accountholder communicates with the issuer customer representative either during or before the transaction in order to authenticate the issuer application). Additional authentication data may further include a second chance initiation type. The second chance initiation type identifies how the request to retry the transaction by the accountholder was initiated. The second chance initiation type includes "declined transaction" (e.g., the initial transaction was declined and accountholder wishes to try again by providing additional authentication data).

In the example embodiment, accountholder computing device 702 transmits 726 the additional authentication data to authentication computing device 706. Accountholder computing device 702 also reinitiates the transaction with merchant computing device 704. Merchant computing device transmits 728 transaction data for the reinitiated transaction to authentication computing device 706. Authentication computing device 706 is configured to store the additional authentication data and use it to authenticate a reinitiated transaction attempt (i.e. by validating transaction data that is received via merchant computing device 704 for the reinitiated transaction). The transaction is initiated with merchant computing device 704 as in the prior attempt.

In the exemplary embodiment, authentication computing device 706 is configured to validate 730 the additional authentication data. For example, authentication computing device 706 may compare a received cryptographic fingerprint representation against a stored cryptographic fingerprint representation for the accountholder to determine that the legitimate accountholder is attempting the transaction. On validation of the additional authentication data, authentication computing device 706 is configured to transmit the second authorization request message to issuer computing device 708. In a related embodiment, authentication computing device 706 includes a validation confirmation for issuer computing device 708. This indicates to issuer computing device 708 that authorization rules that initially caused the decline should be relaxed because the accountholder has been authenticated has been validated and that the transaction should be authorized. In another embodiment, authentication computing device 706 is configured to pass the additional authentication data to issuer computing device 708 in order for issuer computing device 708 to perform the validation of the additional authentication data itself.

At 732 the issuer computing device 708 receives the second authorization request message and authorizes the transaction. Issuer computing device transmits 734 an authorization confirmation message to authentication computing device 706 confirming that the authorization rules have been relaxed for a limited time. Authentication computing device 706 may optionally send 736 a confirmation message to merchant computing device 704 and accountholder computing device 702, which receive the confirmation message at 738 and 740 respectively.

FIG. 8 shows an example message flow by which the authentication computing device (shown in FIG. 2) authenticates an accountholder during a transaction where the accountholder does not re-initiate the transaction. FIG. 8 represents an alternate embodiment to the exemplary embodiment described with respect to FIG. 7. In one embodiment, authentication computing device 806 (similar to authentication computing device 150 shown in FIG. 2) is configured to cause issuer computing device 808 to relax the authorization rules by authenticating the accountholder by requesting additional authentication data from accountholder computing device 802. As shown in FIG. 7, an accountholder initiates 810 a transaction using accountholder computing device 802. The transaction is initiated with merchant computing device 804 (e.g., by holding accountholder computing device 802 in the vicinity of merchant computing device 804).

In initiating the transaction, accountholder computing device 802 transfers to merchant computing device 804 one or more items of standard authentication data which is used to authenticate the accountholder and any associated account. Merchant computing device 804 receives the standard authentication data and transmits 812 it and transaction data to authentication computing device 806. As used herein, transaction data may include transaction amount, transaction date/time, merchant identifiers such as merchant name and location, product/service identifier(s), acquirer or issuer bank identifiers, and any other information relevant to the initiated transaction. In one embodiment, authentication computing device 806 receives the standard authentication data and transaction data directly from merchant computing device 804. In another embodiment, authentication computing device 806 receives the standard authentication data and transaction data from merchant computing device 804 via an acquirer bank computing device (not shown) that is associated with an acquirer bank that may hold an account for the merchant.

Authentication computing device 806 receives the transaction data and standard authentication data and uses these data to generate 814 an authorization request message. Authentication computing device 806 transmits the authorization request message to issuer computing device 808. In one embodiment, issuer computing device 808 reviews the standard authentication data and transaction data and determines that the transaction should be declined for failure to satisfy an authorization rule. Accordingly, issuer computing device 808 declines 816 the transaction, and transmits 818 a decline message to authentication computing device 806.

On receipt of the decline message, authentication computing device 804 determines the reason that the transaction was declined by interpreting a reason code included within the decline. For example, the transaction may be declined because it exceeds a daily transaction amount limit for the account. Authentication computing device 804 is configured to generate 820 an additional authentication data request message to be sent to accountholder computing device 802 via an electronic message channel separate from the transaction message channel. The additional authentication data request message is configured to display a message on accountholder computing device 802 such as "Sorry, your transaction will be declined due to authorization failure. Would you like to provide additional authentication data to complete the transaction? Y/N." Additionally, the display message may provide a list of potential sources of additional authentication data that the accountholder may select from in order to satisfy the authorization requirements for the transaction.

In one embodiment, the additional authentication data request message is sent via an electronic message channel that is separate from the channel used to transmit transaction data. For example, the transmissions in 810 may be sent using a first electronic message channel. For example, the accountholder uses an electronic wallet application to send the standard authentication data to merchant computing device 804. Rather than transmit the additional authentication data request message via the electronic wallet application, authentication computing device 804 sends the additional authentication data request message via a second electronic message channel. This second electronic message channel may be a push notification that appears on the lock screen in the case where the accountholder computing device 802 is a mobile phone device.

In the example embodiment, authentication computing device 804 sends the additional authentication data directly to accountholder computing device 802 without first routing it through merchant computing device 804. For example, assume that the accountholder taps accountholder computing device 802 against merchant computing device 804 to initiate the transaction in 810. Steps 812 through 818 proceed. Then at 820 authentication computing device 804 sends the additional authentication data request message directly to accountholder computing device 802 and the request appears as a push notification on accountholder computing device 802 without the accountholder needing to tap accountholder computing device 802 again to merchant computing device 804.

At 822 accountholder computing device 802 receives the additional authentication data request message and the accountholder decides to provide 824 the additional authentication data. In the example embodiment, accountholder performs some affirmative act on accountholder computing device 802 (e.g., tapping a button or issuing a vocal command) to consent to transmit the additional authentication data. At 824, accountholder computing device 802 retrieves the additional authentication data from an internal database and transmits it to authentication computing device 804.

Authentication computing device 804 receives the additional authentication data at 826 and generates an updated authorization request message. In the example embodiment, the updated authorization request message includes the standard authentication data, transaction data, and now also the additional authentication data. The updated authorization request message is designed to cause issuer computing device 808 to authorize the initial transaction. More specifically, issuer computing device 808 is able to review the additional authentication data and determine that the transaction is being performed by the accountholder and not an unauthorized person. Issuer computing device 808 authorizes 828 the transaction in spite of the transaction data suggesting fraudulent activity by relaxing one or more authorization rules.

As described above, authentication computing device 804 transmits additional authentication data to issuer computing device 808. During this transmission, authentication computing device 804 may generate a correlation identifier and append it to the additional authentication data set received from accountholder computing device 802. In one embodiment, the correlation identifier is configured to enable issuer computing device 808 to associate data messages that relate to the transaction initiated by the accountholder at 810. For example, data from 810 and 812 may be correlated with data from later messages from 824 and 826 using the correlation identifier.

Issuer computing device 808 submits an authorization confirmation message 830 to authentication computing device 804. Authentication computing device 804 receives the authorization confirmation message and is optionally configured to generate 832 a confirmation message to be sent to merchant computing device 804 and accountholder computing device 802 that is received 834 and 836 respectively.

Figure 9:
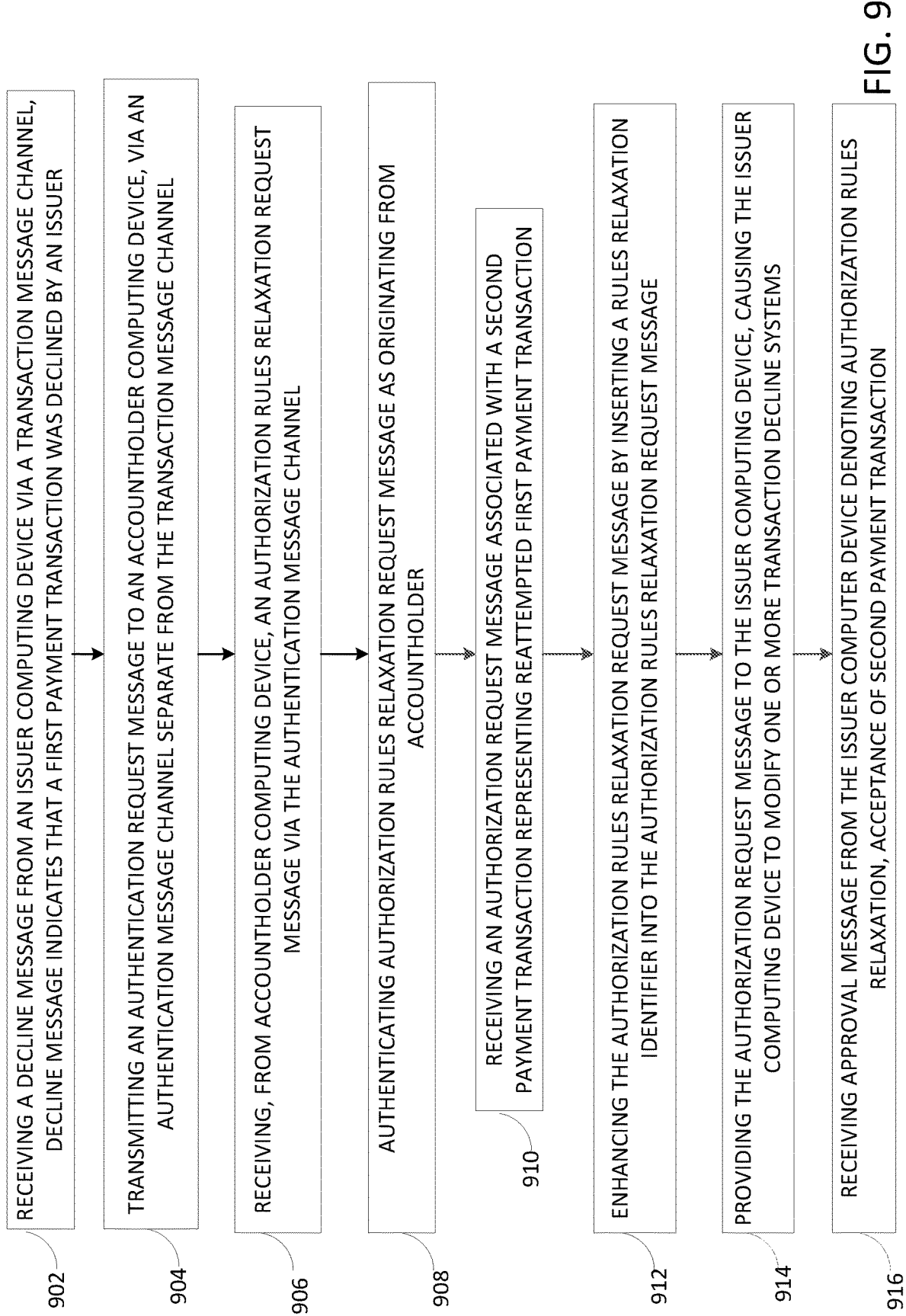

FIG. 9 is an example flow diagram illustrating a method flow by which the authentication computing device authenticates an accountholder. In the example embodiment, an accountholder uses an accountholder computing device to initiate a transaction with a merchant operating a merchant computing device. The merchant computing device transmits (via an acquirer computing device) transaction data and authentication data to the authentication computing device. The authentication computing device processes the received data, transmitting it as well to an issuer computing device associated with an issuer of an account used by the accountholder. The issuer computing device processes the data and communicates back to the authentication computing device.

In the example embodiment, the authentication computing device receives 902 a decline message from an issuer computing device via a transaction message channel. The decline message indicates that a payment transaction previously submitted to the issuer computing device was declined for further processing by the issuer computing device. For example, the issuer computing device may decline the transaction because it indicates potential fraud (e.g., transaction initiated outside accountholder's domicile country). Based on the decline message, the authentication computing device transmits 904 an authorization rules relaxation message to the accountholder computing device operated by the accountholder. In one embodiment, the authorization rules relaxation message is transmitted via an electronic message channel that is separate from the transaction message channel.

In one embodiment, the authentication message i) notifies the accountholder that the initial transaction was declined, ii) notifies the accountholder that the transaction can be reattempted after rules relaxation by the issuer and iii) prompts the accountholder to retry the transaction. In a related embodiment, the authentication message also requests a candidate value for at least one additional authentication variable (e.g., a fingerprint recognition data value stored on the accountholder computing device).

The authentication computing device receives 906, from the accountholder computing device, an authorization rules relaxation response message. In one embodiment, the authorization rules relaxation response message is a request for rules relaxation. In another embodiment, the authorization rules relaxation response message additionally includes the candidate value for the additional authentication variable. The authorization rules relaxation response message serves to confirm to the authentication computing device that the accountholder wishes to retry the transaction (e.g., by providing the additional authentication data variable). Accordingly, the authentication computing device authenticates 908 the authorization rules relaxation response message as originating from the accountholder. This can be done either by validating the candidate value provided or by otherwise determining that it is the legitimate accountholder that is retrying a recent transaction (e.g., via standard transaction data or accountholder device identifiers received with the transaction data). The accountholder reattempts the transaction. The authentication computing device then receives 910 an authorization request message from a merchant computing device for the second, reattempted transaction, wherein the authorization request message includes transaction data and the candidate value. The authentication computing device enhances 912 the authorization request message by inserting a rules relaxation identifier into the authorization request message. For example, the rules relaxation identifier may be a hash value of the candidate value for the additional authentication data variable provided by the accountholder. The rules relaxation identifier may be a confirmation flag confirming to the issuer that the accountholder is legitimate, and/or is reattempting the first transaction, and/or is requesting authorization rules relaxation.

The authentication computing device provides 914 the authorization request message to the issuer computing device, causing 912 the issuer computing device to modify one or more transaction decline systems. The authentication computing device also receives 916 an approval message from the issuer computer device denoting authorization rules relaxation, and acceptance of the second payment transaction.

Figure 10:
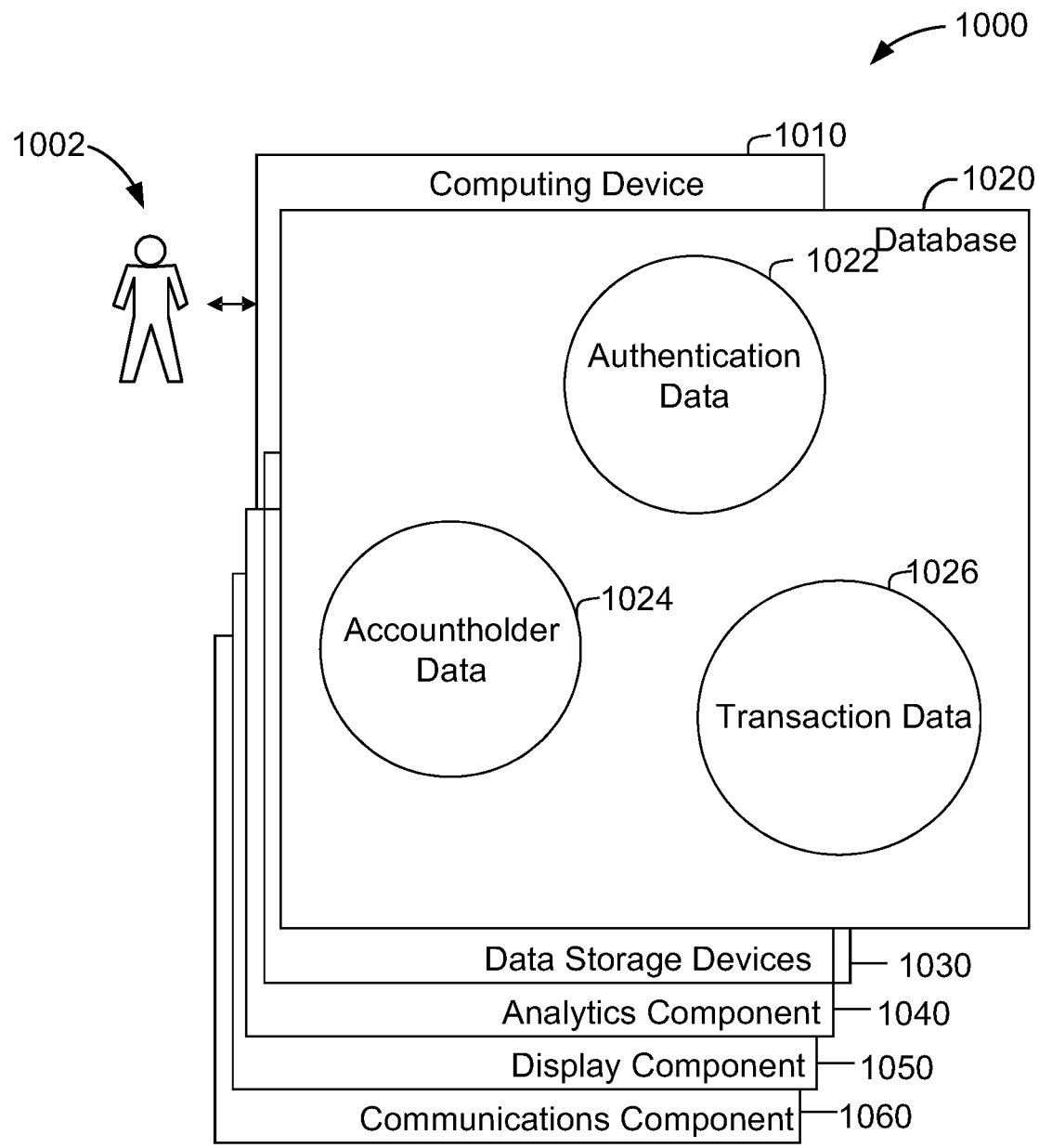

FIG. 10 shows an example configuration of a database 1000 associated with the authentication computing device that, along with other related computing components, may be used to authenticate an accountholder. In some embodiments, computing device 1010 is similar to server system 112 (shown in FIG. 2). User 1002 (such as a user operating server system 112) may access computing device 1010 in order to authenticate an accountholder. In some embodiments, database 1020 is similar to database 120 (shown in FIG. 2). In the example embodiment, database 1020 includes authentication data 1022, accountholder data 1024, and transaction data 1026. Authentication data 1022 includes standard authentication data such as an account identifier, a security code (e.g., 3-digit card verification code (CVC)), accountholder computing device identifier, or the like. Authentication data 1022 also includes additional authentication data such as facial recognition data, fingerprint data, password or passcode data, retinal scan data, voice recognition data, gesture recognition data, device location identifiers, source IP addresses, issuer application identifiers, issuer customer representative identifiers, or the like.

Accountholder data 1024 includes accountholder personal data (e.g., address, telephone number, account numbers), registration data including data related to requests for proactive rules relaxation, issuer data, or the like. Transaction data 1026 includes payment network computing device identifiers, primary account numbers, expiration dates, transaction amounts, transaction dates/times, account data related to the payment card used to perform the transaction (e.g., primary account number associated with payment card, card expiration date, card issuer, card security code, or the like), merchant identifiers, stock-keeping unit (SKU) data relating to the goods or services purchased from the accountholder, or the like.

Computing device 1010 also includes data storage devices 1030. Computing device 1010 also includes analytics component 1040 that processes authentication requests received from various accountholder computing devices. Computing device 1010 also includes display component 1050 that receives processed authentication data from analytics component 1040 and converts it into various formats in order to provide data in a format compatible with various different accountholder computing devices. Computing device 1010 also includes communications component 1060 which is used to communicate with accountholder computing devices, issuer computing devices, and merchant computing devices, using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to authenticate an accountholder. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of authenticating an accountholder for relaxing authorization rules applied to a payment transaction initiated by the accountholder with a merchant, the method implemented by a server system of a payment interchange network, the server system configured to route messages over a transaction message channel between a merchant computing device associated with the merchant and an issuer computing device, the server system including at least one processor in communication with a memory, the method comprising:
   detecting, on the transaction message channel, a decline message from the issuer computing device, wherein the decline message indicates that a first payment transaction initiated by the accountholder was declined by an issuer associated with the issuer computing device, wherein the decline message includes a reason code for the decline, and wherein the issuer issued an account to the accountholder;
   determining from the reason code that the decline resulted from a failure to satisfy one of a plurality of authorization rules;
   transmitting, via an authentication message channel, upon detecting the decline message, an authorization rules relaxation message to an accountholder computing device operated by the accountholder, wherein the authentication message channel is separate from the transaction message channel, and wherein the authorization rules relaxation message prompts the accountholder to request authorization rules relaxation;
   receiving, via the authentication message channel, from the accountholder computing device, an authorization rules relaxation response message;
   authenticating the authorization rules relaxation response message as originating from the accountholder;
   receiving, via the transaction message channel from the merchant computing device, an authorization request message associated with a second payment transaction initiated by the accountholder at the merchant, wherein the second payment transaction represents a reattempt of the first payment transaction;
   enhancing, in response to the authentication of the authorization rules relaxation response message being successful, the authorization request message by inserting a rules relaxation identifier into the authorization request message, wherein the rules relaxation identifier is configured to inform the issuer computing device that the accountholder has requested, and satisfied at least one requirement for, the authorization rules relaxation;
   transmitting, via the transaction message channel, the enhanced authorization request message to the issuer computing device, causing the issuer computing device to modify one or more transaction decline systems, wherein the modifying of the one or more transaction decline systems includes relaxing the authorization rule that prompted the decline of the first payment transaction; and
   receiving, via the transaction message channel in response to the enhanced authorization request message, an approval message from the issuer computing device, the approval message denoting relaxation of one or more authorization rules and acceptance of the second payment transaction by the issuer.

2. A method in accordance with claim 1, wherein the authorization rules relaxation response message includes a candidate value associated with at least one additional authentication variable, and wherein the additional authentication variable includes one or more of: a passcode, a facial recognition biometric data identifier, and a fingerprint recognition biometric data identifier.

3. A method in accordance with claim 2, wherein authenticating the accountholder further comprises:
   comparing the candidate value to a stored value, wherein the stored value is associated with the account of the accountholder; and
   determining that the candidate value matches the stored value.

4. A method in accordance with claim 1, wherein transmitting the authorization rules relaxation message to the accountholder computing device via the authentication message channel further comprises transmitting a push notification to the accountholder computing device.

5. A method in accordance with claim 1, further comprising:
   transmitting the approval message to the accountholder computing device; and
   transmitting the approval message to a point-of-sale (POS) device operated by the merchant.

6. A method in accordance with claim 2, further comprising:
   reformatting the candidate value received from the accountholder computing device; and
   combining the candidate value and transaction data for the second payment transaction into the enhanced authorization request message, wherein the enhanced authorization request message is in a format compatible with the issuer computing device.

7. A method in accordance with claim 1, further comprising:
   receiving transaction data for the first payment transaction in association with the decline message from the issuer computing device;
   parsing the transaction data to extract a transaction data value; and
   causing the authorization rules relaxation message to be displayed on the accountholder computing device, wherein the displayed authorization rules relaxation message includes the transaction data value.

8. A system for authenticating an accountholder for relaxing authorization rules applied to a payment transaction conducted by the accountholder with a merchant, the system comprising:
   a memory device configured to store authentication data; and
   a server system of a payment interchange network, the server system including at least one processor in communication with the memory device and configured to route messages over a transaction message channel between a merchant computing device associated with the merchant and an issuer computing device, and further configured to:
      detect, on the transaction message channel, a decline message from the issuer computing device, wherein the decline message indicates that a first payment transaction initiated by the accountholder was declined by an issuer associated with the issuer computing device, wherein the decline message includes a reason code for the decline, and wherein the issuer issued an account to the accountholder;
      determine from the reason code that the decline resulted from a failure to satisfy one of a plurality of authorization rules;

transmit, via an authentication message channel, upon detecting the decline message, an authorization rules relaxation message to an accountholder computing device operated by the accountholder, wherein the authentication message channel is separate from the transaction message channel, and wherein the authorization rules relaxation message prompts the accountholder to request authorization rules relaxation;

receive, via the authentication message channel, from the accountholder computing device, an authorization rules relaxation response message;

authenticate the authorization rules relaxation response message as originating from the accountholder;

receive, via the transaction message channel from the merchant computing device, an authorization request message associated with a second payment transaction initiated by the accountholder at the merchant, wherein the second payment transaction represents a reattempt of the first payment transaction;

enhance, in response to the authentication of the authorization rules relaxation response message being successful, the authorization request message by inserting a rules relaxation identifier into the authorization request message, wherein the rules relaxation identifier is configured to inform the issuer computing device that the accountholder has requested, and satisfied at least one requirement for, the authorization rules relaxation;

transmit, via the transaction message channel, the enhanced authorization request message to the issuer computing device, causing the issuer computing device to modify one or more transaction decline systems, wherein the modifying of the one or more transaction decline systems includes relaxing the authorization rule that prompted the decline of the first payment transaction; and receive, via the transaction message channel in response to the enhanced authorization request message, an approval message from the issuer computing device, the approval message denoting relaxation of one or more authorization rules and acceptance of the second payment transaction by the issuer.

9. A system in accordance with claim 8, wherein the authorization rules relaxation response message includes a candidate value associated with at least one additional authentication variable, and wherein the additional authentication variable includes one or more of: a passcode, a facial recognition biometric data identifier, and a fingerprint recognition biometric data identifier.

10. A system in accordance with claim 9, wherein, to authenticate the accountholder by validating the candidate value for the at least one additional authentication variable, the at least one processor is further configured to:
compare the candidate value to a stored value, wherein the stored value is associated with an account of the accountholder; and
determine that the candidate value matches the stored value.

11. A system in accordance with claim 8, wherein, to transmit the authorization rules relaxation message to the accountholder computing device via the authentication message channel further comprises transmitting a push notification to the accountholder computing device.

12. A system in accordance with claim 8, wherein the at least one processor is further configured to:

transmit the approval message to the accountholder computing device; and
transmit the approval message to a point-of-sale (POS) device operated by the merchant.

13. A system in accordance with claim 9, wherein the at least one processor is further configured to:
reformat the candidate value received from the accountholder computing device; and
combine the candidate value and transaction data for the second payment transaction into the enhanced authorization request message, wherein the enhanced authorization request message is in a format compatible with the issuer computing device.

14. A system in accordance with claim 8, wherein the at least one processor is further configured to:
receive transaction data for the first payment transaction in association with the decline message from the issuer computing device;
parse the transaction data to extract a transaction data value; and
cause the authorization rules relaxation message to be displayed on the accountholder computing device, wherein the displayed authorization rules relaxation message includes the transaction data value.

15. A non-transitory computer readable medium that includes computer executable instructions for authenticating an accountholder for relaxing authorization rules applied to a payment transaction conducted by the accountholder with a merchant, wherein when executed by a server system of a payment interchange network, the server system configured to route messages over a transaction message channel between a merchant computing device associated with the merchant and an issuer computing device, the server system comprising at least one processor in communication with a memory device, the computer executable instructions cause the at least one processor to:

detect, on the transaction message channel, a decline message from the issuer computing device, wherein the decline message indicates that a first payment transaction initiated by the accountholder was declined by an issuer associated with the issuer computing device, wherein the decline message includes a reason code for the decline, and wherein the issuer issued an account to the accountholder;

determine from the reason code that the decline resulted from a failure to satisfy one of a plurality of authorization rules;

transmit, via an authentication message channel, upon detecting the decline message, an authorization rules relaxation message to an accountholder computing device operated by the accountholder, wherein the authentication message channel is separate from the transaction message channel, and wherein the authorization rules relaxation message prompts the accountholder to request authorization rules relaxation;

receive, via the authentication message channel, from the accountholder computing device, an authorization rules relaxation response message;

authenticate the authorization rules relaxation response message as originating from the accountholder;

receive, via the transaction message channel from the merchant computing device, an authorization request message associated with a second payment transaction initiated by the accountholder at the merchant, wherein the second payment transaction represents a reattempt of the first payment transaction;

enhance, in response to the authentication of the authorization rules relaxation response message being successful, the authorization request message by inserting a rules relaxation identifier into the authorization request message, wherein the rules relaxation identifier is configured to inform the issuer computing device that the accountholder has requested, and satisfied at least one requirement for, the authorization rules relaxation;

transmit, via the transaction message channel, the enhanced authorization request message to the issuer computing device, causing the issuer computing device to modify one or more transaction decline systems, wherein the modifying of the one or more transaction decline systems includes relaxing the authorization rule that prompted the decline of the first payment transaction; and receive, via the transaction message channel in response to the enhanced authorization request message, an approval message from the issuer computing device, the approval message denoting relaxation of one or more authorization rules and acceptance of the second payment transaction by the issuer.

16. A non-transitory computer readable medium in accordance with claim 15, wherein the authorization rules relaxation response message includes a candidate value associated with at least one additional authentication variable, and wherein the additional authentication variable includes one or more of: a passcode, a facial recognition biometric data identifier, and a fingerprint recognition biometric data identifier.

17. A non-transitory computer readable medium in accordance with claim 16, wherein the computer-executable instructions cause the at least one processor to:

compare the candidate value to a stored value, wherein the stored value is associated with an account of the accountholder; and determine that the candidate value matches the stored value.

18. A non-transitory computer readable medium in accordance with claim 15, wherein the computer-executable instructions cause the at least one processor to:

transmit the approval message to the accountholder computing device; and transmit the approval message to a point-of-sale (POS) device operated by the merchant.

19. A non-transitory computer readable medium in accordance with claim 16, wherein the computer-executable instructions cause the at least one processor to:

reformat the candidate value received from the accountholder computing device; and combine the candidate value and transaction data for the payment transaction into the enhanced authorization request message, wherein the enhanced authorization request message is in a format compatible with the issuer computing device.

20. A method in accordance with claim 1, further comprising:

receiving, from the accountholder computing device prior to detecting the decline message, a request to register for an authorization rules relaxation program, the request including registration data including at least authentication data to be used for relaxing authorization rules; and storing the registration data.

* * * * *